(12) United States Patent
Engel

(10) Patent No.: US 7,319,574 B2
(45) Date of Patent: Jan. 15, 2008

(54) ARC FAULT DETECTION APPARATUS, METHOD AND SYSTEM FOR AN UNDERGROUND ELECTRICAL CONDUCTOR

(75) Inventor: Joseph C. Engel, Monroeville, PA (US)

(73) Assignee: Eaton Corporation, Cleveland, OH (US)

( * ) Notice: Subject to any disclaimer, the term of this patent is extended or adjusted under 35 U.S.C. 154(b) by 382 days.

(21) Appl. No.: 11/135,162

(22) Filed: May 23, 2005

(65) Prior Publication Data

US 2006/0262466 A1 Nov. 23, 2006

(51) Int. Cl.
*H02H 3/00* (2006.01)
*H02H 3/10* (2006.01)
*G08B 3/00* (2006.01)
*H04B 5/00* (2006.01)

(52) U.S. Cl. .................. 361/50; 361/5; 361/6; 361/9; 361/10; 340/286.11

(58) Field of Classification Search ............. 361/5, 361/9, 6, 10; 340/286.11
See application file for complete search history.

(56) References Cited

U.S. PATENT DOCUMENTS

| | | | | |
|---|---|---|---|---|
| 3,559,194 | A | * | 1/1971 | Bisberg .................. 340/517 |
| 3,696,366 | A | * | 10/1972 | Parsons ................. 340/518 |
| 4,591,942 | A | * | 5/1986 | Willard et al. ............ 361/97 |
| 5,103,365 | A | * | 4/1992 | Uchida et al. ........... 361/102 |
| 5,224,006 | A | | 6/1993 | MacKenzie et al. |
| 5,315,531 | A | | 5/1994 | Oravetz et al. |
| 5,384,712 | A | | 1/1995 | Oravetz et al. |
| 5,420,799 | A | | 5/1995 | Peterson et al. |
| 5,596,473 | A | * | 1/1997 | Johnson et al. ........... 361/97 |
| 5,691,869 | A | | 11/1997 | Engel et al. |
| 6,373,257 | B1 | * | 4/2002 | Macbeth et al. .......... 324/536 |
| 6,456,471 | B1 | * | 9/2002 | Haun et al. ............... 361/42 |
| 6,522,228 | B2 | | 2/2003 | Wellner et al. |
| 6,522,509 | B1 | | 2/2003 | Engel et al. |
| 6,542,056 | B2 | | 4/2003 | Nerstrom et al. |
| 6,577,478 | B2 | * | 6/2003 | Kim et al. ................ 361/42 |
| 6,639,769 | B2 | * | 10/2003 | Neiger et al. ............. 361/42 |
| 6,700,417 | B2 | * | 3/2004 | Kawahito et al. .......... 327/94 |
| 6,710,688 | B2 | | 3/2004 | Wellner et al. |
| 6,744,254 | B2 | | 6/2004 | Clarey et al. |

(Continued)

OTHER PUBLICATIONS

ANSWERS.COM Fast Facts, "Rogowski coil", http://www.answers.com/topic/rogowski-coil, 2005, 3 pp.

(Continued)

*Primary Examiner*—Michael Sherry
*Assistant Examiner*—Zeev Kitov
(74) *Attorney, Agent, or Firm*—Martin J. Moran

(57) ABSTRACT

A non-invasive underground arc fault detection apparatus is for an underground electrical conductor. The apparatus includes an electric circuit having an opening for admitting the electrical conductor therethrough. The electric circuit includes one or two transducers adapted to output a first signal representative of current flowing in the electrical conductor and a second signal. An arc fault detection circuit cooperates with the electric circuit to output a third signal derived from the first signal. The third signal is representative of an arc fault of the electrical conductor. An audible annunciator cooperates with the arc fault detection circuit to annunciate the third signal. A power supply cooperates with the electric circuit and is adapted to power the arc fault detection circuit and the annunciator from the second signal.

24 Claims, 2 Drawing Sheets

U.S. PATENT DOCUMENTS

| | | |
|---|---|---|
| 6,748,340 B2 * | 6/2004 | Otsuki et al. ............... 702/150 |
| 6,807,035 B1 | 10/2004 | Baldwin et al. |
| 6,965,225 B2 * | 11/2005 | de Buda ................. 324/117 R |
| 7,053,674 B1 * | 5/2006 | Romero et al. ............... 327/94 |
| 2002/0036430 A1 * | 3/2002 | Welches et al. ............... 307/18 |

OTHER PUBLICATIONS

HOWSTUFFWORKS, Inc., "How Exploding Manholes Work", http://science.howstuffworks.com/exploding-manhole1.htm, 1998-2005, 5 pp.

* cited by examiner

ARC FAULT DETECTION APPARATUS, METHOD AND SYSTEM FOR AN UNDERGROUND ELECTRICAL CONDUCTOR

BACKGROUND OF THE INVENTION

1. Field of the Invention

This invention pertains generally to detection and annunciation apparatus and, more particularly, to such an apparatus for detecting and annunciating arc faults. The invention also relates to methods and systems for detecting and annunciating arc faults.

2. Background Information

Arcing is a luminous discharge of electricity across an insulating medium, usually accompanied by the partial volatilization of electrodes. An arc fault is an unintentional arcing condition in an electrical circuit, such as an electrical conductor. Arc faults can be caused, for instance, by worn insulation between adjacent bared conductors, by other insulation failures and in other situations where conducting elements are in close proximity. Arc faults in systems can be intermittent since the magnetic repulsion forces generated by the arc current force the conductors apart to extinguish the arc. Mechanical forces then bring the conductors together again in order that another arc is struck. Arcing faults between two conductors can also result from an over the surface conductive path forming on an insulator caused by, for example, salt water. Such a fault can be intermittent, since the resulting heat will dry the water and terminate the arcing condition. This process can then repeat.

During sporadic arc fault conditions, the overload capability of a circuit breaker will not function since the root-mean-squared (RMS) value of series arc fault current pulses is too small to activate the thermal based automatic trip circuit. The addition of electronic arc fault sensing to a circuit breaker adds one of the elements required for sputtering arc fault protection—ideally, the output of an electronic arc fault sensing circuit directly trips and, thus, opens the circuit breaker. See, for example, U.S. Pat. Nos. 6,710,688; 6,542,056; 6,522,509; 6,522,228; 5,691,869; and 5,224,006.

A cast-iron manhole cover can weigh between about 85 and 300 pounds (about 39 to 136 kg). Explosions have propelled these massive discs anywhere from 1 foot to 50 feet (about 0.3 to 15 m) into the air. These explosions cause a loss of power in the aftermath and, moreover, provide a risk of injury. Such manhole explosions are typically caused when a spark from electrical wiring ignites gas inside the manhole. For example, underground power cables can become frayed from aging, from corrosive chemicals (e.g., road salt), from overload or from vermin biting them. Such cables may carry, for example, 120/208 VAC or 13 KVAC. Under arc fault conditions, in which the arcing current is believed to be relatively small as compared to the normal power line current, the arcing heats the insulation of the cables. Fuses called "limiters" in this application protect the cables. The limiters are designed to prevent long term overheating of the cable's insulation due to a sustained overcurrent condition. However, the limiters do not respond to an insulation related arc fault because the current's RMS value is too low.

It is believed that network relays cannot be employed as suitable protectors either, since the network relays cannot detect the relatively low level arcing current, much less identify the location of the arc fault. If a protector cannot locate the fault, even if it knew there was a fault, it would not be advisable to open the protector since a relatively large geographic area would be without power. Also, once the network is deenergized, the smoke from the fault would cease and, thus, the fault could not be located.

As the arcing heats the cable insulation, the insulation smolders and releases flammable gases. Further, hydrogen may be formed from a reaction of water and copper or aluminum with heat from parallel arcing. In turn, the pressure from the gases may build up inside the manhole. The arcing, also, may ignite the insulation and/or the gases, which can cause a powerful explosion. Depending on the amount of gas pressure built up and the gas fuel-to-air mixture inside the manhole, the cover may flip over or be launched several feet or more in the air. Alternatively, there may not be an explosion, but just a substantial amount of smoke or fire.

Accordingly, there is a substantial need to improve underground power cabling. For example, some power companies are in the process of replacing solid manhole covers with slotted manhole covers. These new covers allow the gas to be released less violently and, also, give an early warning to possible explosions. See, for example, http://science.howstuffworks.com/exploding-manhole1.htm. However, these slotted manhole covers cannot be used in locations where run off from a rainstorm could result in manhole flooding.

The time from initial arcing to smoke, fire and/or explosion is not known, but may be relatively long (e.g., months or years). Furthermore, such underground problems can go undetected until a smoking manhole is reported. Then, a crew must go to the site, remove the manhole cover and attempt to isolate the problem in the underground conduit by cutting power cables. This may take time and money and, moreover, may subject the crew to dangerous conditions.

Hence, there remains the very real and substantial need for a method and a system to reliably detect and communicate an arcing power cable in an underground conduit before it becomes an explosion hazard.

Accordingly, there is room for improvement in apparatus, methods and systems for detecting and annunciating arc faults.

It is known to employ a current transformer in a circuit breaker trip unit for sensing current and for powering the trip unit. Another means for sensing an alternating current (AC) current utilizes a Rogowski coil. The Rogowski coil includes a helical coil of wire with a lead from one end of the coil returning through the center of the coil to the other end, in order that both terminals are at the same end of the coil. The whole assembly is then wrapped around a straight conductor. A "split" core is one way of doing this. The resultant voltage induced in the coil is proportional to the rate of change of current in the straight conductor. Since the Rogowski coil has an air core, rather than an iron core, it has a relatively low inductance and can respond to relatively fast-changing currents. Also, because it has no iron core to saturate, it is highly linear even when subjected to relatively large currents, such as those used in electric power transmission and welding. See, for example, http://www.answers.com/topic/rogowski-coil.

SUMMARY OF THE INVENTION

These needs and others are met by the present invention, which provides a non-invasive (e.g., no cutting of an electrical conductor; no piercing of an electrical conductor's insulation) system and method for detecting and annunciating arc faults. The apparatus employs an electric circuit, such as at least one transducer, a Rogowski coil or one or more current transformers having an opening for admitting an electrical conductor therethrough, without piercing or penetrating the insulation of the electrical conductor.

In accordance with one aspect of the invention, an arc fault detection apparatus for an electrical conductor comprises: an electric circuit having an opening for admitting the electrical conductor therethrough, the electric circuit including at least one transducer adapted to output a first signal representative of current flowing in the electrical conductor and a second signal; an arc fault detection circuit cooperating with the electric circuit to output a third signal derived from the first signal, the third signal being representative of an arc fault of the electrical conductor; an annunciator cooperating with the arc fault detection circuit to annunciate the third signal; and a power supply cooperating with the electric circuit, the power supply being adapted to power at least one of the arc fault detection circuit and the annunciator from the second signal.

The annunciator may be a wireless transmitter adapted to wirelessly communicate the third signal to a remote device.

As another aspect of the invention, a method of detecting and annunciating an arc fault of an electrical conductor comprises: employing an electric circuit including an opening; admitting the electrical conductor through the opening of the electric circuit; outputting from the electric circuit a first signal representative of current flowing in the electrical conductor and a second signal; detecting an arc fault of the electrical conductor from the first signal; annunciating the detected arc fault; and powering at least one of the detecting and the annunciating from the second signal.

The method may comprise employing outputting an audio signal as the annunciating; and modulating the audio signal to indicate amplitude of the arc fault of the electrical conductor or to indicate a count of at least one occurrence of the arc fault.

The method may reset the audio signal after a predetermined time.

As another aspect of the invention, an arc fault detection system for an electrical conductor comprises: an arc fault detection device comprising: an electric circuit having an opening for receiving the electrical conductor therethrough, the electric circuit including at least one transducer adapted to output a first signal representative of current flowing in the electrical conductor and a second signal, an arc fault detection circuit cooperating with the electric circuit to output a third signal from the first signal, the third signal being representative of an arc fault of the electrical conductor, a first wireless communication device cooperating with the arc fault detection circuit to wirelessly communicate the third signal, and a power supply cooperating with the electric circuit, the power supply being adapted to power at least one of the arc fault detection circuit and the first wireless communication device from the second signal; and an arc fault annunciator device comprising: a second wireless communication device cooperating with the first wireless communication device to wirelessly receive the third signal, and an annunciator cooperating with the second wireless communication device to annunciate the received third signal.

The electrical conductor may be an underground electrical conductor, and the arc fault detection device may be adapted to be mounted underground with the underground electrical conductor.

The first and second wireless communication devices may be radio frequency modems.

The arc fault detection circuit may comprise an audio annunciator adapted to annunciate the third signal as an audio signal, and the second wireless communication device may be adapted to wirelessly communicate a reset signal to the first wireless communication device to reset the audio signal.

The arc fault detection circuit may comprise a time-of-day clock cooperating with the arc fault detection circuit to associate a time-of-day with the third signal and the arc fault, and the second wireless communication device may be adapted to wirelessly communicate a time-of-day signal to the first wireless communication device to set the time-of-day.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the terms "admitting" or "receiving" shall expressly include, but not be limited by, admitting or receiving an electrical conductor through an opening of an electric circuit, passing an electrical conductor through a core having an opening, or opening and wrapping a split core around an electrical conductor.

As employed herein, the term "wireless" shall expressly include, but not be limited by, radio frequency (RF), light, visible light, infrared, ultrasound, wireless area networks, IEEE 802.11 (e.g., 802.11a; 802.11b; 802.11g), IEEE 802.15 (e.g., 802.15.1; 802.15.3, 802.15.4), other wireless communication standards (e.g., without limitation, ZigBee™ Alliance standard), DECT, PWT, pager, PCS, Wi-Fi, Bluetooth™, and cellular.

The present invention is described in association with a single electrical conductor for a 60 Hz power system, although the invention is applicable to a wide range of power distribution systems having one or more electrical conductors and/or any suitable power line frequency.

Figure 1:
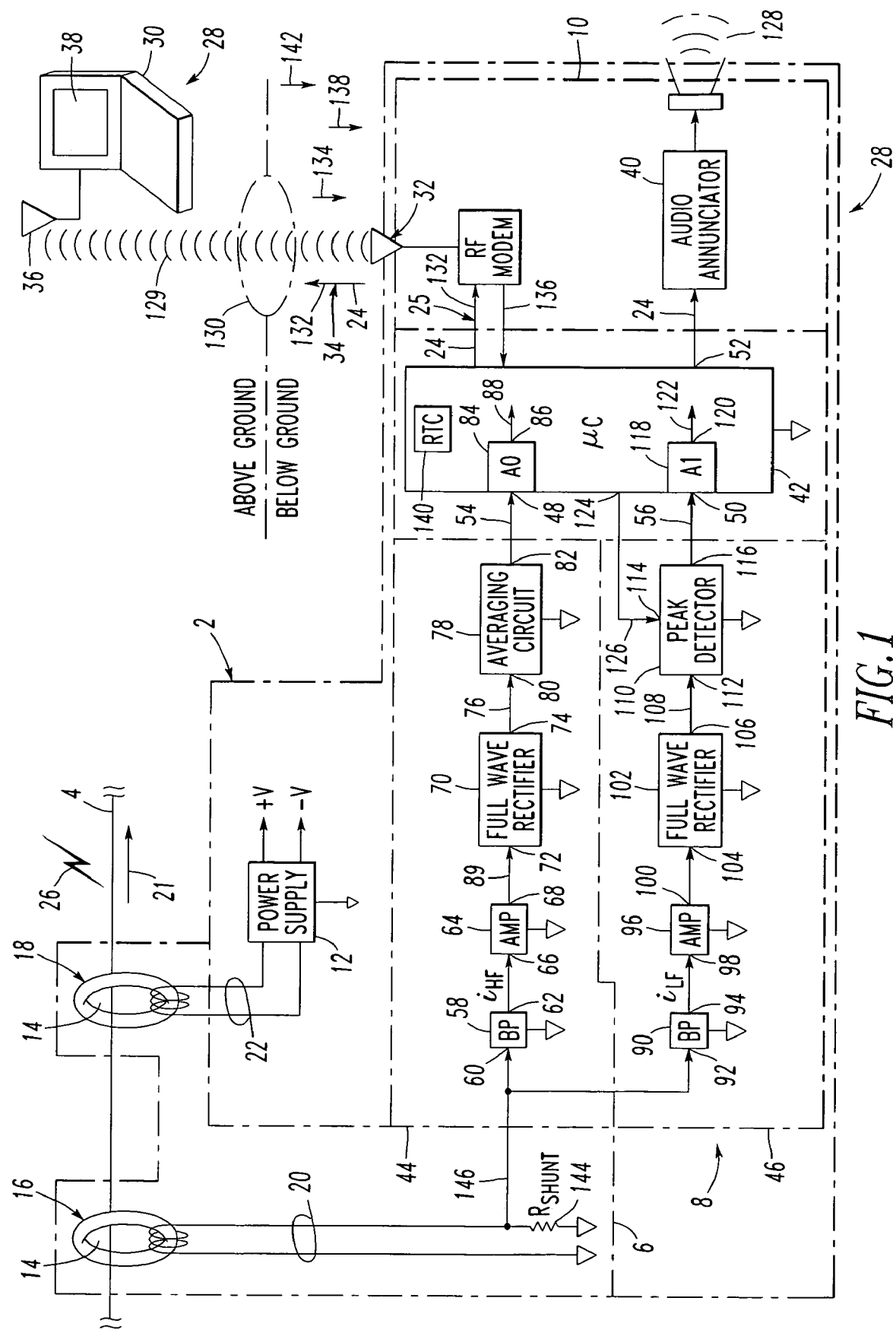
FIG. 1 is a block diagram in schematic form of an underground arc fault detector/alarm circuit and an associated system in accordance with the present invention.

Referring to FIG. 1, an arc fault detection apparatus, such as an arc fault detector/alarm circuit 2, is for an electrical conductor, such as, for example, an underground power conductor 4. The apparatus 2 includes an electric circuit 6, an arc fault detection circuit 8, an annunciator 10 and a power supply 12. The electric circuit 6 has one or more openings 14 for admitting or receiving the electrical conductor 4 therethrough. The electric circuit 6 includes one or two transducers (e.g., two current transformers (CTs) 16,18 are shown in FIG. 1) adapted to output a first signal 20 representative of current 21 flowing in the electrical conductor 4 and a second signal 22. The arc fault detection circuit 8 cooperates with the electric circuit 6 to output a third signal 24 derived from the first signal 20. The third signal 24 is representative of an arc fault 26 of the electrical conductor 4. The annunciator 10 cooperates with the arc fault detection circuit 8 to annunciate the third signal 24 and, thus, the occurrence of the arc fault 26. The power supply 12 cooperates with the electric circuit 6 and is adapted to power one or both of the arc fault detection circuit 8 and the annunciator 10 from the second signal 22.

An arc fault detection system 28 for the electrical conductor 4 includes the arc fault detector/alarm circuit 2 and a suitable arc fault annunciator device, such as, for example, a portable personal computer (PC) 30. The annunciator 10 of the arc fault detector/alarm circuit 2 includes a first wireless communication device 32 cooperating with the arc fault detection circuit 8 to wirelessly communicate the third signal 24 as part of a wireless signal 34. The PC 30 includes a second wireless communication device 36 cooperating with the first wireless communication device 32 to wirelessly receive the wireless signal 34. The PC 30 also includes a suitable annunciator, such as, for example, a display 38, cooperating with the second wireless communication device 36 to annunciate the received wireless signal 34 and/or to display arcing information 132 from the wireless signal 34 related to the arc fault 26. The signal 25 from microcomputer (μC) 42 to the first wireless communication device 32 is a suitable transmit bit stream signal that contains a suitable range of information (e.g., the third signal 24 that signifies the existence of the arc fault 26; other arcing information 132). The signal 136 to the μC 42 from the first wireless communication device 32 is a suitable receive bit stream signal, which includes, for example, a reset request from a wireless reset signal 134.

Although the example annunciator 10 includes both the first wireless communication device 32 and an audio annunciator 40 (e.g., without limitation, a suitable Piezoelectric annunciator), any suitable annunciator(s) adapted to annunciate an arc fault may be employed.

In this example, the power supply 12 is adapted to power both of the arc fault detection circuit 8 and the annunciator 10, which includes the first wireless communication device 32 and the audio annunciator 40.

EXAMPLE 1

The example arc fault detection circuit 8 includes a suitable processor, such as a microcomputer (μC) 42 and two input circuits 44,46. The μC 42 includes a first input 48, a second input 50 and an output 52. The first circuit 44 inputs the first signal 20 and outputs a fourth signal 54 to the first μC input 48. The second circuit 46 also inputs the first signal 20 and outputs a fifth signal 56 to the second μC input 50. The μC 42 is adapted to output on the output 52 the third signal 24, which is representative of the arc fault 26 and which is derived from the fourth and fifth signals 54,56, as will be described.

Numerous characteristics of an arc fault, such as 26, caused by an insulation failure of the electrical conductor 4 may be recognized. Two example characteristics are employed by the first (high frequency) input circuit 44 and the second (low frequency) input circuit 46 of FIG. 1. Both of these circuits 44,46 employ the instability of the arcing current as an indicator of arcing. For example, conventional arc fault detection techniques are employed based upon the voltage 146.

In this example, a first characteristic of the arc fault 26, such as a cable insulation arcing event, is the existence of relatively high frequency components extending into the radio frequency band. In this example, frequencies in the band of about 200 KHz to about 1 MHz are employed. A suitable band pass filter (BP) 58 is employed in the high frequency input circuit 44. The lower 200 KHz limit of the BP 58 is set to avoid power line carrier (PLC) signals that may exist below that frequency. For example, a PLC frequency of 125 KHz is popular. The upper limit of the BP 58 is set to minimize interference from radio frequency signals. Hence, the fourth signal 54 is an analog signal derived from the first signal 20 and may have an example range of frequencies from about 200 KHz to about 1 MHz.

The BP 58 includes an input 60 for the first signal 20 and an output 62 ($i_{HF}$). An amplifier 64 includes an input 66 for the band pass filter output 62 and an output 68. A full wave rectifier 70 includes an input 72 for the amplifier output 68 and an output 74 having a direct current (DC) signal 76. A suitable short term averaging circuit 78 includes an input 80 for the full wave rectifier output 74 and an output 82. The μC 42 includes an analog-to-digital converter (A0) 84 having the input 48 for the averaging circuit output 82 and an output 86 having a digital signal 88.

The full wave rectifier 70 is employed to convert the alternating current (AC) signal 89 of the amplifier output 68 to the DC signal 76, which is filtered by the averaging circuit 78 before being sent to the uC analog-to-digital converter (A0) 84. For example, a suitable filter time constant of several line frequency cycles is employed. The uC 42 compares the digital signal 88, which is equivalent to the averaged fourth signal 54, to a suitable reference (e.g., any suitable value; a value determined by experimentation; a value representative of the signal present during a cable insulation arcing event) (not shown).

The second input circuit 46 includes a suitable filter, such as, for example, a band pass (BP) filter 90 including an input 92 for the first signal 20 and an output 94 ($i_{LF}$), an amplifier 96 including an input 98 for the filter output 94 and an output 100, a full wave rectifier 102 including an input 104 for the amplifier output 100 and an output 106 having a direct current signal 108, and a suitable peak detector circuit 110 including a first input 112 for the full wave rectifier output 106, a second input 114 and an output 116. The μC 42 includes a second analog-to-digital converter (A1) 118 having the input 50 for the peak detector circuit output 116, a first output 120 having a digital signal 122 and a second output 124 having a reset signal 126 for the peak detector second input 114.

A second example characteristic of the arc fault 26 is the existence of an unstable series of current pulses (e.g., without limitation, no more than one for each cycle of the power line). Unlike conventional electrical loads that, over a relatively short time, tend to either monotonically increase or monotonically decrease over many cycles, the amplitude of the current pulses typically varies in both an increasing and a decreasing fashion. A suitable band pass filter (BP) 90 may be employed with a pass band centered about, for example, 400 Hz for an example 60 Hz power line. Hence, the fifth signal 56 is an analog signal derived from the first signal 20 and has an example range of frequencies centered about 400 Hz.

It is desirable to filter the example 60 Hz component as much as possible since it tends to be relatively large and not contain useful information. Similar to the high frequency input circuit 44, in the example low frequency input circuit 46, the amplifier 96 and the full wave rectifier 102 follow the filter 90. The peak detector circuit 110 is employed to sample and hold each half-cycle peak, in order that the μC analog-to-digital converter (A1) 118 may convert the peak value or fifth signal 56 to the corresponding digital value 122. After conversion, the peak detector circuit 110 is reset by the reset signal 126 and the process is repeated for each half-cycle of the power line. For example, it is known that cycle-to-cycle variations in these half-cycle peaks can be indicative of an arc fault due to an insulation failure.

Should one or both of these example arc fault characteristics be present, then the arc fault 26 is detected, and the third signal 24 is asserted and suitably announced, as will be discussed.

EXAMPLE 2

Preferably, the audio annunciator 40 (e.g., without limitation, a Piezoelectric transducer) is employed. The output audio signal 128 is important since the arc fault detector/alarm circuit 2 is typically mounted underground. Hence, practical mechanisms for reporting an arcing event are limited. The audio signal 128 may be reported, for example, by a passing citizen or by regular inspections by a maintenance crew of a power distribution entity, as will be discussed. In this example, the arc fault detector/alarm circuit 2 is suitably adapted to be mounted underground with the underground electrical conductor 4.

EXAMPLE 3

The output audio signal 128 may be suitably modulated by the μC 42 at output 52 by employing a suitable amplitude or intensity, a suitable frequency or tone, and/or a suitable pulse rate modulating pattern. The modulation may be employed to indicate information such as, for example, arcing amplitude (e.g., as determined from the peak value or fifth signal 56 as output by the peak detector circuit 110) and/or count of arcing occurrences (e.g., the arcing may be intermittent and may occur in spurts over a relatively long time).

EXAMPLE 4

The uC 42 may be suitably programmed to clear the annunciation or alarm automatically by turning the third signal 24 off and, thus, resetting the output audio signal 128 after a suitable predetermined delay time (e.g., without limitation, any suitable time; several hours; several days; several weeks; several months).

EXAMPLE 5

FIG. 1 shows an optional second communication mechanism, which employs a relatively short-range wireless (e.g., without limitation, radio frequency (RF)) link 129 between the wireless communication devices 32,36 to communicate from below ground through, for example, a manhole opening 130 to above ground where the PC 30 may be employed to record and analyze arcing information 132 from the arc fault detector/alarm circuit 2.

For example, the first wireless communication device 32 may be an RF modem, in order to allow the arcing information 132 to be read by the above ground PC 30 with a compatible second wireless communication device 36, such as a compatible RF modem. The RF transmission may include, for example, the address or serial number of the particular arc fault detector/alarm circuit 2 (e.g., this may be traceable to the corresponding manhole opening 130 by recording the serial number and manhole information during installation). Hence, the annunciator 10 may include a wireless transmitter adapted to wirelessly communicate the third signal 24 to the remote PC 30.

EXAMPLE 6

The RF link 129 may advantageously be employed to reset the annunciation or alarm by the arc fault detector/alarm circuit 2. Here, the second wireless communication device 36 may be adapted to wirelessly communicate a wireless reset signal 134 to the first wireless communication device 32 to reset, at 136, the third signal 24 and, thus, the output audio signal 128.

EXAMPLE 7

The RF link 129 may also be advantageously employed to download a wireless time-of-day signal 138 from the PC 30 to the arc fault detector/alarm circuit 2, which may record and log not only the occurrence of an arcing event, but also the time that it occurred through real time clock (RTC) 140. For example, control from the PC 30 may include: (1) sending the signal 138 from the PC 30 to set the time of the RTC 140 executed by the uC 42 below ground; and/or (2) sending a wireless request signal 142 to read the arcing information 132 from the wireless signal 34 concerning the arc fault 26 (e.g., when it started; how often it has occurred (if intermittent); the magnitude of the arcing event) after which the arcing information 132 is displayed by the display 38. Hence, the uC 42 may associate the time-of-day from the RTC 140 with the third signal 24 and the arc fault 26, and the second wireless communication device 36 may be adapted to wirelessly communicate the time-of-day signal 138 to the first wireless communication device 32 to set the time-of-day in the RTC 140.

EXAMPLE 8

The arcing information 132 may be synchronized with arcing event information from other arc fault detector/alarm circuits (not shown) associated with other nearby manholes (not shown), in order to isolate an electrical conductor fault between, for example, two manholes (only the one manhole opening 130 is shown). After the faulted electrical conductor, such as 4, is identified, it may be de-energized by cutting the cable at each manhole and then pulling a new cable between the manholes.

EXAMPLE 9

The line current 21 may be sensed by any suitable isolated circuit. For example, FIG. 1 shows two current transformers (CTs) 16,18. The first CT 16 senses the current 21 and the separate second CT 18 powers the arc fault detector/alarm circuit 2. The CTs 16,18 are adapted to be inductively coupled to the electrical conductor 4. The first CT 16 outputs the first signal 20 and the second CT 18 outputs the second signal 22. Here, both of the CTs 16,18 include the openings 14. In this example two-CT configuration, a suitable current shunt $R_{SHUNT}$ 144 is employed to convert the secondary current of the current sensing CT 16 to a voltage 146 for subsequent arc fault detection.

EXAMPLE 10

Figure 2:
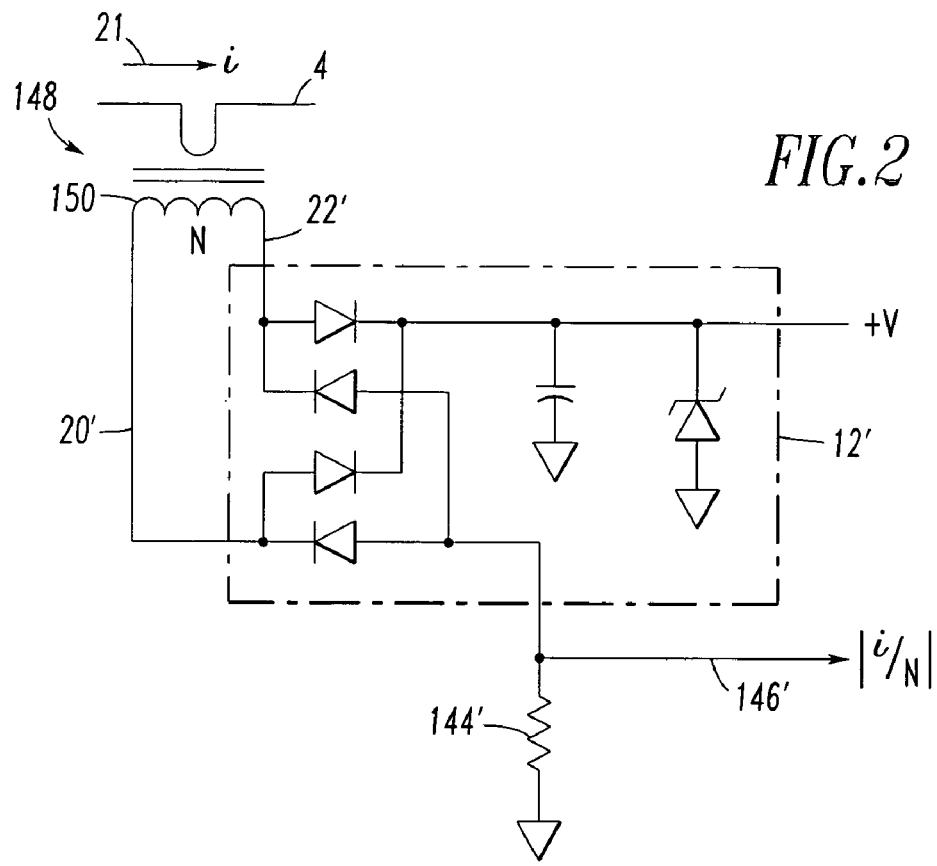
FIG. 2 is a block diagram in schematic form of a current transformer and power supply suitable for use with the arc fault detection circuit and the annunciator of FIG. 1 in accordance with another embodiment of the invention.

Alternatively, as shown in FIG. 2, a single CT 148 may be employed for both current sensing through signal 146' and for energizing a power supply 12' through signal 22'. The CT 148 includes a secondary winding 150 having N turns. The CT 148 may be similar to the CTs 16,18 of FIG. 1 and interfaces to the electrical conductor 4 in a like manner (e.g., by admitting or receiving the same through an opening thereof). The CT 148 is adapted to be inductively coupled to the electrical conductor 4 and outputs the signals 22',20'. A suitable current shunt 144' is employed to convert the secondary current of the CT 148 to the voltage signal 146' (e.g., representing the absolute value of the current, i, 21 divided by the number of turns, N) for subsequent arc fault detection.

EXAMPLE 11

Figure 3:
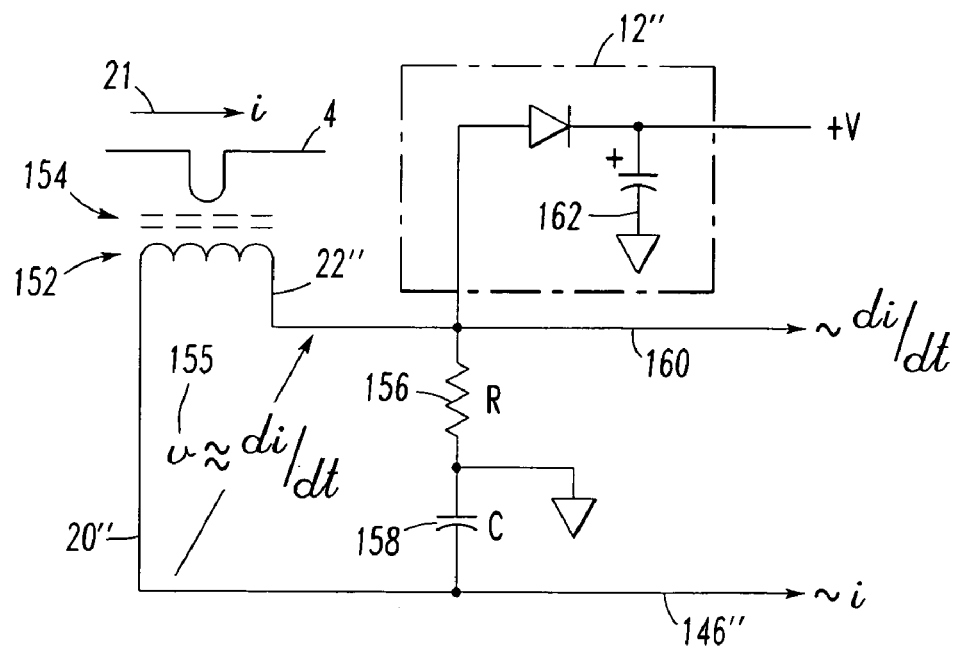
FIG. 3 is a block diagram in schematic form of a Rogowski coil and power supply suitable for use with the arc fault detection circuit and the annunciator of FIG. 1 in accordance with another embodiment of the invention.

As another alternative, as shown in FIG. 3, a Rogowski coil 152 has a core 154 and a voltage, v, output 155 that is proportional to the derivative (di/dt) of the current 21 being sensed in the electrical conductor 4. Somewhat similar to the CTs 16,18 of FIG. 1, the Rogowski coil 152 interfaces to the electrical conductor 4 in a like manner (e.g., by admitting or receiving the same through an opening thereof). The Rogowski coil 152 is adapted to be inductively coupled to the electrical conductor 4 and outputs the first signal 20" and the second signal 22".

A practical problem with using a linear CT, such as 16 (FIG. 1) or 148 (FIG. 2) for reliably measuring currents as large as, for example, 1000 amperes, is that the CT core cannot be allowed to saturate. One preferred way to measure relatively high current accurately, without a relatively large iron core, is with a Rogowski coil, such as 152, which employs an air core 154 rather than an iron core and which does not saturate.

The sensor provided by the Rogowski coil 152 is basically an inductor with a one-turn primary and a multiple-turn secondary. The output voltage 155 is proportional to the derivative of the sensed current (di/dt). Unlike a CT that needs a relatively low resistance secondary load, the Rogowski coil 152 is employed with a relatively high resistance load including the resistor (R) 156 and capacitor (C) 158. The resistance value of R is chosen to be relatively large, in order that the coil 152 is unloaded. As a non-limiting example, the RC value is greater than 0.1 s.

The voltage 160 across the resistor 156 is proportional to di/dt and, hence, amplifies the relatively high frequency components of the current, i, 21. The output signal 146" may be fed into the input 60 of the high frequency input circuit 44 of FIG. 1 for a corresponding arc fault detector/alarm circuit. Alternatively, the voltage 160 (which is proportional to di/dt) may be employed with less amplification by amplifier 64 (FIG. 1). The capacitance value of C is made relatively large enough, in order that most of the coil voltage 155 is dropped across the resistor 156. This results in the capacitor 158 integrating the current through the resistor 156 such that the capacitor's voltage at signal 146" is proportional to the current, i, 21. This output signal 146" may be employed for the input 92 of the low frequency input circuit 46 of FIG. 1 for the corresponding detector/alarm circuit.

The power supply 12" may be electrically connected from the Rogowski coil output 22" to circuit common 162, assuming that the power needs are kept relatively very low.

EXAMPLE 12

In order to get a relatively larger output voltage 155 (FIG. 3), a suitable powdered iron core material having a relative (to air) permeability of about 10 or higher may be employed in place of the example air core 154. The sensor output voltage 155 is directly proportional to core permeability. This material does not easily saturate. See FIGS. 33 and 34 and the corresponding disclosure of U.S. Pat. No. 4,980,794, which is incorporated by reference herein.

EXAMPLE 13

Although FIG. 1 shows the arc fault detector/alarm circuit 2 for a single phase conductor, such as the example electrical conductor 4, if plural (e.g., three) conductors or phases (not shown) are employed, then plural (e.g., three) corresponding detector/alarm circuits (not shown), like the circuit 2, may be employed, one for each of the conductors or phases.

EXAMPLE 14

Preferably, the arc fault detector/alarm circuit 2 is housed in a suitable water proof case having no physical electrical connections in or out.

EXAMPLE 15

Preferably, the CTs 16,18 and 148 and Rogowski coil 152 of respective FIGS. 1, 2 and 3 are of the split core type, in order that the core can be installed around the corresponding electrical conductor 4 without cutting or otherwise piercing or penetrating the conductor insulation (not shown). Hence, arcing is sensed by monitoring only the current 21 of the conductor 4, rather than by monitoring the conductor voltage, which would disadvantageously impact the conductor insulation, which must be maintained for underground cabling.

EXAMPLE 16

Although example arc fault characteristic input circuits 44,46 are disclosed, any suitable arc fault detector and/or any suitable arc fault input circuit may be employed either alone or in combination with another suitable arc fault input circuit and/or one or both of the arc fault characteristic input circuits of FIG. 1. For example, one or more conventional arc fault detection techniques may be employed based upon the voltage 146.

EXAMPLE 17

One or both of the arc fault detection circuit 8 and the annunciator 10 may be powered from a suitable battery power supply (not shown). The battery power supply may be charged and/or recharged from the second signal 22 through a suitable charging or recharging circuit (not shown).

EXAMPLE 18

The arc fault detector/alarm circuit 2 may employ another suitable mechanism to reset the annunciation or alarm. For example, a suitable manual input, such as a push button input (not shown) to the μC 42, may be operated through a waterproof cover (not shown) over the entire apparatus wherein the cover is made of a flexible material such as plastic or rubber (e.g., in order that the push button may be pushed without piercing the cover with an opening).

The disclosed arc fault detector/alarm circuit 2 is non-invasive and does not pierce or penetrate the cable insulation of the electrical conductor 4. The circuit 2 is powered by one or more example CTs, such as 16,18 or 148, or by the example Rogowski coil 152. The arc fault 26 is detected by sensing an RF signal associated with that electric arc.

Underground communications through the manhole opening 130 are via the audio annunciator 40 and/or the wireless link 129.

While for clarity of disclosure reference has been made herein to the exemplary display 38 for annunciating an arc fault and/or displaying arc fault information, it will be appreciated that such information may be stored, printed on hard copy, be computer modified, or be combined with other data. All such processing shall be deemed to fall within the terms "display" or "displaying" as employed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An arc fault detection apparatus for an electrical conductor, said apparatus comprising:
    an electric circuit having an opening for admitting said electrical conductor therethrough, said electric circuit including at least one transducer adapted to output a first signal representative of current flowing in said electrical conductor and a second signal;
    an arc fault detection circuit cooperating with said electric circuit to output a third signal derived from said first signal, said third signal being representative of an arc fault of said electrical conductor;
    an annunciator cooperating with said arc fault detection circuit to annunciate said third signal; and
    a power supply cooperating with said electric circuit, said power supply being adapted to power at least one of said arc fault detection circuit and said annunciator from said second signal,
    wherein said annunciator is adapted to output an audio signal to annunciate said third signal, and
    wherein said annunciator is further adapted to modulate said audio signal to indicate amplitude of said arc fault of said electrical conductor or to indicate a count of at least one occurrence of said arc fault.

2. The apparatus of claim 1 wherein said at least one transducer comprises first and second current transformers adapted to be inductively coupled to said electrical conductor, said first current transformer outputting said first signal and said second current transformer outputting said second signal; and wherein said first and second current transformers include openings, which form the opening of said electric circuit.

3. The apparatus of claim 1 wherein said at least one transducer comprises a current transformer adapted to be inductively coupled to said electrical conductor, said current transformer outputting said first signal and said second signal; and wherein said current transformer includes the opening of said electric circuit.

4. The apparatus of claim 1 wherein said at least one transducer comprises a Rogowski coil adapted to be inductively coupled to said electrical conductor, said Rogowski coil outputting said first signal and said second signal; and wherein said Rogowski coil includes the opening of said electric circuit.

5. The apparatus of claim 1 wherein said arc fault detection circuit comprises a processor including a first input, a second input and an output, a first circuit inputting said first signal and outputting a fourth signal to the first input of said processor, and a second circuit inputting said first signal and outputting a fifth signal to the second input of said processor; and wherein said processor is adapted to output on the output thereof said third signal, which is representative of said arc fault of said electrical conductor and which is derived from said fourth and fifth signals.

6. The apparatus of claim 1 wherein said arc fault detection circuit comprises a processor and an input circuit, which is adapted to input to said processor an analog signal derived from said first signal, said analog signal having a range of frequencies from about 200 KHz to about 1 MHz.

7. The apparatus of claim 6 wherein said input circuit comprises a band pass filter including an input for said first signal and an output, an amplifier including an input for the output of said band pass filter and an output, a full wave rectifier including an input for the output of said amplifier and an output having a direct current signal, and an averaging circuit including an input for the output of said full wave rectifier and an output; and wherein said processor includes an analog-to-digital converter having an input for the output of said averaging circuit and an output having a digital signal.

8. The apparatus of claim 1 wherein said arc fault detection circuit comprises a processor and an input circuit, which is adapted to input to said processor an analog signal derived from said first signal, said analog signal having a range of frequencies centered at about 400 Hz.

9. The apparatus of claim 8 wherein said input circuit comprises a filter including an input for said first signal and an output, an amplifier including an input for the output of said filter and an output, a full wave rectifier including an input for the output of said amplifier and an output having a direct current signal, and a peak detector circuit including a first input for the output of said full wave rectifier, a second input and an output; and wherein said processor includes an analog-to-digital converter having an input for the output of said peak detector, a first output having a digital signal and a second output having a reset signal for the second input of said peak detector.

10. The apparatus of claim 1 wherein said annunciator is an audio annunciator.

11. The apparatus of claim 1 wherein said annunciator comprises a wireless transmitter adapted to wirelessly communicate said third signal to a remote device.

12. A method of detecting and annunciating an arc fault of an electrical conductor, said method comprising:
    employing an electric circuit including an opening;
    admitting said electrical conductor through the opening of said electric circuit;
    outputting from said electric circuit a first signal representative of current flowing in said electrical conductor and a second signal;
    detecting an arc fault of said electrical conductor from said first signal;
    annunciating said detected arc fault;
    powering at least one of said detecting and said annunciating from said second signal;
    employing outputting an audio signal as said annunciating; and
    modulating said audio signal to indicate amplitude of said arc fault of said electrical conductor or to indicate a count of at least one occurrence of said arc fault.

13. The method of claim 12 further comprising resetting said audio signal after a predetermined time.

14. The method of claim 12 further comprising employing as said electric circuit at least one transducer including a split core; and opening and wrapping said split core around said electrical conductor.

15. An arc fault detection system for an electrical conductor, said system comprising:
an arc fault detection device comprising:
  an electric circuit having an opening for receiving said electrical conductor therethrough, said electric circuit including at least one transducer adapted to output a first signal representative of current flowing in said electrical conductor and a second signal,
  an arc fault detection circuit cooperating with said electric circuit to output a third signal from said first signal, said third signal being representative of an arc fault of said electrical conductor,
  a first wireless communication device cooperating with said arc fault detection circuit to wirelessly communicate said third signal, and
  a power supply cooperating with said electric circuit, said power supply being adapted to power at least one of said arc fault detection circuit and said first wireless communication device from said second signal; and
an arc fault annunciator device comprising:
  a second wireless communication device cooperating with said first wireless communication device to wirelessly receive said third signal, and
  an annunciator cooperating with said second wireless communication device to annunciate said received third signal,
wherein said electrical conductor is an underground electrical power conductor, and
wherein said arc fault detection device is adapted to be mounted underground with said underground electrical power conductor.

16. The system of claim 15 wherein said first and second wireless communication devices are radio frequency modems.

17. The system of claim 15 wherein said arc fault annunciator device is a personal computer; wherein said second wireless communication device is a wireless modem; and wherein said annunciator is a display.

18. The system of claim 15 wherein said arc fault detection circuit comprises an audio annunciator adapted to annunciate said third signal as an audio signal; and wherein said second wireless communication device is adapted to wirelessly communicate a reset signal to said first wireless communication device to reset said audio signal.

19. The system of claim 15 wherein said arc fault detection circuit comprises a time-of-day clock cooperating with said arc fault detection circuit to associate a time-of-day with said third signal and said arc fault; and wherein said second wireless communication device is adapted to wirelessly communicate a time-of-day signal to said first wireless communication device to set said time-of-day.

20. The system of claim 15 wherein said arc fault detection device is adapted to collect information associated with said arc fault; wherein said second wireless communication device is adapted to wirelessly transmit a request signal to said first wireless communication device and to responsively wirelessly receive said collected information from said first wireless communication device; and wherein said arc fault annunciator device is adapted to display said received collected information.

21. The apparatus of claim 1 wherein said annunciator is adapted to modulate said audio signal to indicate said amplitude of said arc fault of said electrical conductor.

22. The apparatus of claim 1 wherein said annunciator is adapted to modulate said audio signal to indicate said count of at least one occurrence of said arc fault.

23. The method of claim 12 further comprising
  modulating said audio signal to indicate said amplitude of said arc fault of said electrical conductor.

24. The method of claim 12 further comprising
  modulating said audio signal to indicate said count of at least one occurrence of said arc fault.

* * * * *